POWDERED NUT PRODUCT

Jack R. Durst, Osseo, Minn., assignor to The Pillsbury Company, Minneapolis, Minn., a corporation of Delaware
No Drawing. Filed Oct. 5, 1964, Ser. No. 401,709
15 Claims. (Cl. 99—126)

The present invention relates to a nut product and more particularly to a powdered free flowing nut product and a process for making it.

Nut butters have long been an important product of nuts and nut butters are best exemplified by peanut butter. Similar butters, however, may also be made from almonds, pecans, walnuts, hazel nuts, cashews, sesame seeds, and the like. Although the immediate invention will be described with reference to peanut butter (because it is the most common form of nut butter), it applies with equal force to nuts of the class described above. The common characteristic for the application of the invention is a cotyledon which consists of fat cells trapped in a continuous phase of non-fat carbohydrate and protein.

That common characteristic is exemplified by the peanut which consists of a continuous phase of carbohydrate, protein, fiber and ash and a discontinuous phase of fat. The fat cells are in the form of "lakes" and are surrounded by the non-fat constituents.

The composition of the peanut cotyledon varies considerably depending on the peanut variety (Runner, Spanish, or Virginia), and agronic conditions. In general, however, the cotyledon consists of roughly equal weights of fat and non-fat constituents and more particularly:

| Constituent | Range, Percent by weight | Typical Analysis, Percent by weight |
|---|---|---|
| Fat | 35–55 | 44 |
| Protein | 20–37 | 26 |
| Carbohydrates | 10–39 | 21 |
| Moisture | 3–13 | 5 |
| Fiber | 1–9 | 2 |
| Ash | 2–3 | 2 |
| | | 100 |

Peanut butter is traditionally made from a shelled peanut by roasting, blanching and grinding to a pasty consistency. In the blanching step the roasted product is separated into the testa (red skin), germ (small hearts) and cotyledons (peanut halves or split peanuts). The testa is aspirated away and the garm is separated from the cotyledons by screening. The roasted cotyledons are ground at elevated temperatures to a smooth paste. Salt, sugar and emulsifiers may be added during the grinding. Hydrogenated peanut oil may also be added or substituted for a portion of the peanut oil. The butter is then cooled and packaged.

The grinding of the cotyledons ruptures the fat cells and essentially reverses the orientation of the fat, non-fat constituents causing the pasty consistency. In the whole cotyledon, as stated previously, the continuous phase is the carbohydrate, protein, ash components or the non-fat components. The fat cells are entrapped in the non-fat components and form the discontinuous phase. After the nut is ground and the fat cells ruptured, the fat forms the continuous phase and the non-fat constituents, in the form of small particles, form the discontinuous phase. Thus the orientation is reversed.

The grinding and resulting reversal of the orientation of the constituents gives peanut butter its familiar properties. It has a pasty consistency and is not free flowing. It is not readily dispersible. The fat constituent tends to separate from the non-fat constituents and many attempts have been made to prevent the separation. Substantial packaging (glass jars, for example) is required to contain the product and to prevent oxidation of the fat content and resulting rancidity.

Although the roasting and grinding changes the properties of the nut considerably, its composition is not altered. Ignoring additions such as salt, sugar and emulsifiers, peanut butter consists of the same constituents that make up the unground cotyledon. A typical analysis of peanut butter is:

| | Percent by weight |
|---|---|
| Fat | 47 |
| Protein | 27 |
| Carbohydrate, fiber and ash | 24 |
| Moisture | 2 |
| | 100 |

Peanut flour is another product of the prior art. It is made from the cotyledon by extracting the oil by the hydraulic press method under heat. The de-fatted pressed product is ground and classified according to particle size by means of air streams. Peanut flour typically consists of:

| | Percent by weight |
|---|---|
| Protein | 59 |
| Carbohydrate | 21 |
| Fat | 10 |
| Moisture | 4 |
| Ash | 4 |
| Fiber | 2 |
| | 100 |

The fat content distinguishes peanut flour from peanut butter. As can be seen above, typical fat content of peanut flour is 10%, whereas the range of fat in peanut butter is considerably greater at 35–55%. Because the fat content of peanut flour is considerably less than the fat content of peanut butter, the fat in the peanut flour does not form a continuous phase. The flour is made up of discrete particles each having a very thin coating of fat and is free flowing. But because it contains considerably less fat than peanut butter it is obviously less nutritious.

Thus it is an object of the present invention to provide a product containing nut butter constituents that is free flowing. More particularly it is an object to provide a free flowing product without the removal of any fat from the cotyledon.

It is another object to make a powdered nut product that contains the quantity of fat found in the whole cotyledon, yet is readily dispersible in liquids and powdered materials.

It is a further object to provide a powdered nut product that contains the quantity of fat present in a whole cotyledon in which the fat does not separate from the non-fat constituents under ambient conditions.

A further object is to make a product which can be packaged simply without resort to glass jars.

Each of the above objects is fulfilled by the present invention which consists of both a process and the resulting product.

The process comprises grinding the cotyledon to a pasty consistency, adding a quantity of water at least equal in weight to the weight of the nut paste, mixing the water and the cotyledon to form an emulsion, and drying the emulsion.

The process may begin with the whole cotyledon or may begin with prepared nut butter. The grinding step may be avoided by beginning with prepared nut butter.

The product that results from the process is a dry free-flowing nut product that contains the same constituents that make up the whole cotyledon in the same proportions. The orientation of the constituents however is reversed. The fat is encapsuled in the non-fat constituents. In other words, after processing the orientation of the fat and non-fat constituents is basically the same as the orientation in the whole cotyledon but reversed from the orientation of the nut butter. A typical analysis of peanut butter processed according to the present invention shows the following:

| | Percent by weight |
|---|---|
| Fat | 44 |
| Protein | 27 |
| Carbohydrate, fiber and ash | 26 |
| Moisture | 3 |
| | 100 |

The product is distinguished from the nut butter of the prior art on the basis of the orientation of fat and non-fat constituents and its properties also distinguish it. It is free flowing and readily dispersible in water and comminuted materials, yet contains the same quantity of fat found in nut butters of the prior art. There is no tendency of the fat to separate from the non-fat constituents. Moreover, the product does not require substantial packaging such as glass jars because the fat constituent is encapsulated and does not contact the package directly.

The product is distinguished from peanut flour in that it contains fat in excess of the fat content of the peanut flour and in that the fat present is encapsulated. Peanut flour contains about 10% fat. The product of the present invention contains a quantity of fat (35–55%) equal to the fat content of the whole cotyledon and nut butter. It is distinguished from peanut particles on a basis of particle size.

If peanuts are ground to a particle size that does not yield a pasty consistency, that is, if the fat cells are not ruptured sufficiently to provide a continuous phase of fat surrounding the smaller non-fat particles, the product is free flowing, has a fat, non-fat constituent orientation corresponding to the orientation of the product of the present invention, and quantitatively corresponds to the product of the present invention. To avoid releasing the fat constituent, however, requires that the whole cotyledon be ground to a much larger particle size than the particles of the present invention and more particularly the ground particles must be at least larger than the fat cells in the cotyledon. The particles of the present invention have, as an upper limit, a particle size equal to the size of the fat lakes in the cotyledon from which the particles are ground. When ground to that size a pasty conistency will result. Thus the product of the present invention has a particle size that is less than the particle size to which whole cotyledons may be ground and dispersibility of the ground particles maintained.

If a peanut is ground to a particle size of 20 mesh (U.S. Sieve Series), a pasty consistency results. A pasty consistency also results if peanut cotyledons are ground to a larger size, but a particle size of 20 mesh is a reasonable particle size limit.

The particle size range of the particles comprising the present invention may vary considerably depending upon the particular nut chosen and the fineness desired in the ground product. The upper limit in any event is the size of the fat lake in the whole cotyledon. More particularly, the upper limit of particle size of particles making up the present invention is 20 mesh (U.S. Sieve Series), i.e. 100% of the powdered, free flowing product of the present invention passed a No. 20 sieve.

According to the process of the present invention the roasted cotyledon is ground to form a pasty product. As stated previously, the upper limit of particle size to which the peanut cotyledon must be ground is 20 mesh sieve size. It is preferred, however, that the particles making up the pasty product be smaller than 140 mesh. Water is then added in a quantity equal to or greater than the weight of the ground cotyledon. The water and ground cotyledon are then mixed to form a stable emulsion. A suitable mixer for the formation of the emulsion is a Waring Blendor. If such a blendor is used, the water and ground cotyledon should be mixed at high speed for about one minute, the mixture scraped from the side of the mixing bowl and then mixed for another minute. Regardless of the method of mixing used, mixing should be continued until a stable emulsion is formed.

A test for determining when mixing is complete is as follows: Remove one drop of the ground cotyledon, water emulsion and add it to 250 milliliters of water at 140° F. If fat is released, mixing is not completed. If no fat is released, the protein in the cotyledon has been hydrated sufficiently to encapsulate the fat and mixing is complete. Whether or not fat is released is a visual determination that can be readily made by one skilled in the art. Any released fat will be apparent on the surface of the water.

The emulsion may then be dried. One suitable method is spray drying. In the event that spray drying is used, the emulsion may be diluted with water to form a less viscous emulsion for running through the spray dryer. One suitable spray dryer is a Bowen. Other spray dryers, however, may be used and both a centrifugal head dryer and a nozzle type dryer may be used.

As stated previously, the lower limit of water is a quantity equal to the weight of the ground cotyledon. The upper limit is established only by the ability of the mixture to emulsify with mechanical mixing. As much as four parts water to one part ground cotyledon may be added. Obviously, however, the more water that is added the more water must be removed in drying. It is, therefore, a practical limitation that the upper limitation of water to ground cotyledon be about two parts water to one part ground cotyledon. Although spray drying is preferred the emulsion might be drum dried, air dried, or freeze dried.

When a powdered nut product is made according to the present invention through the use of prepared nut butter such as peanut butter, it may be necessary to subject the nut butter to elevated temperatures to melt the fat. If the prepared butter contains hydrogenated peanut oil (fat) the oil may not be in a liquid state at room temperature. In that case it is preferred that the nut butter be heated to about 120° to 150° F. to melt the peanut oil prior to the addition of water and the formation of the emulsion.

The process of the present invention is particularly adaptable to the addition of flavorings such as honey, imitation nut flavors, fruit flavors, and the like. They may be added with the water and encapsulated along with the fat.

If the process is practiced through the use of a prepared nut butter, either an emulsified or non-emulsified nut butter may be used.

The following are examples of the invention:

*Example 1*

1600 grams of peanut butter containing hydrogenated peanut oil was heated to 145° F. 1600 milliliters of water at 160° F. was added and the mixture was blended for one minute in a Waring Blendor at high speed. 2100 milliliters of water was added to dilute the emulsion for spray drying. The emulsion was spray dried on a Bowen centrifugal head spray dryer. The chamber temperature was 185° F. and the exit temperature 155° F. The product was free flowing and was analyzed and found to contain:

| | Percent |
|---|---|
| Moisture | 2.65 |
| Protein | 26.65 |
| Fat (acid hydrolysis) | 43.45 |
| Carbohydrate, fiber and ash | 27.25 |
| | 100 |

*Example II*

1200 grams of peanut butter containing hydrogenated vegetable oil was heated to 150° F. and placed in a Waring Blendor. 1700 milliliters of water at 160° F. was added. The peanut butter and water was mixed in a Waring Blendor at high speed for one minute. The mixture was stable in hot water and was diluted for spray drying. Spray drying was done on a Bowen centrifugal head spray dryer. The chamber temperature was 170° F. and the exit temperature 135° F. The powdered free flowing product that resulted was analyzed and compared to the analysis of the butter prior to treatment:

| | Prior to Treatment, Percent by weight | Powdered Product, Percent by weight |
|---|---|---|
| Moisture | 1.81 | 2.40 |
| Protein | 29.32 | 29.40 |
| Fat (Ethyl Ether) | 53.15 | ¹ 51.98 |
| Carbohydrate, Fiber and Ash | 15.72 | 16.22 |

¹ 52.92% by acid hydrolysis.

*Example III*

A powdered product was made from raw peanut cotyledons under the following conditions. Peanut cotyledons were ground to a particle size less than 140 mesh (U.S. Sieve Series). A dispersion of 45% ground product and 55% water at 140° F. was formed by mixing at high speed in a Waring Blendor. The dispersion was spray dried and a powdered free flowing product resulted.

Although a product may be made from raw cotyledon, it is preferred that the cotyledon be roasted prior to the formation of the dispersion since flavor is improved.

The particle size distribution of peanut butters may be determined by extruding the fat and analyzing the relatively dry, free flowing residue. Such an analysis yields the following average particle size distribution:

| S.E.D. microns: | Percent (by weight) finer than |
|---|---|
| 80 | 100 |
| 60 | 99 |
| 40 | 98 |
| 30 | 95 |
| 20 | 84 |
| 10 | 47 |

If a free flowing product is made from a whole nut cotyledon it is preferred that the particle size distribution approximate the particle size distribution shown above. In any event, however, the cotyledon must be ground to a particle size smaller than 105 S.E.D. microns or 140 mesh (U.S. Sieve Series).

What is claimed is:

1. A method for making a powdered nut product consisting generally of an edible fat globule encapsulated by non-fat nut cotyledon constituents which consists essentially of:
    (a) providing a nut butter selected from the group consisting of peanuts, almonds, pecans, walnuts, hazel nuts, cashews and sesame butter and having the oil contained therein in a liquid state,
    (b) mixing said nut butter with at least an equal amount (by weight) of water for a time sufficient to form a stable emulsion, and
    (c) drying said emulsion to a particle size such that all particles pass through a 20-mesh sieve (U.S. Sieve Series).

2. The method of claim 1 wherein said emulsion is spray dried.

3. The method of claim 1 wherein said nut butter is peanut butter.

4. A method of making a powdered nut product consisting essentially of an edible fat globule encapsulated by non-fat nut cotyledon constituents which consists essentially of:
    (a) providing nut butter selected from the group consisting of peanuts, almonds, pecans, walnuts, hazel nuts, cashews and sesame butter and having at least a portion of the oil contained therein in a solid state,
    (b) heating said nut butter to at least 120° F. to melt said oil contained therein,
    (c) mixing said nut butter with at least an equal amount (by weight) of water for a time sufficient to form an emulsion, and
    (d) drying said emulsion to a particle size such that all particles pass through a 20-mesh sieve (U.S. Sieve Series).

5. The method of claim 4 wherein said nut butter is peanut butter.

6. A dry free-flowing powdered nut product containing an edible fat and adapted to be dispersed in an aqueous medium without releasing fat therefrom, said nut product consisting essentially of a discontinuous phase of fat globules and a continuous phase of at least one member of non-fat nut cotyledon constituents selected from the group consisting of peanuts, almonds, pecans, walnuts, hazel nuts, cashews and sesame seeds, said non-fat cotyledon constituents forming a continuous phase for encapsulating the discontinuous phase of said fat globules, said product having a particle size such that all particles pass through a 20-mesh sieve (U.S. Sieve Series).

7. The nut product according to claim 6 wherein said nut product contains at least 35% by weight fat.

8. A free-flowing powdered nut product containing an edible fat and adapted to be dispersed in an aqueous medium without releasing fat therefrom, said nut product consisting essentially of a discontinuous phase of nut cotyledon fat globules in an amount ranging from 35 to 55 weight percent and continuous non-fat nut cotyledon constituents phase of at least one member selected from the group consisting of peanuts, almonds, pecans, walnuts, hazel nuts, cashews and sesame seeds, said continuous phase consisting essentially of nut protein in an amount ranging from 20 to 37 weight percent and nut carbohydrate, nut fiber and nut ash in an amount ranging from 10 to 39 weight percent, the continuous non-fat nut cotyledon constituent phase encapsulating the discontinuous phase of nut cotyledon fat globules and said product having a particle size such that all the particles pass through a 20-mesh sieve (U.S. Sieve Series).

9. A method for making a powdered nut product from nut cotyledons, said cotyledons consisting essentially of an edible fat encapsulated by non-fat nut constituents which consists essentially of:
    (a) releasing the edible fat encapsulated by non-fat constituents contained in nut cotyledons of at least one member selected from the group consisting essentially of peanuts, almonds, pecans, walnuts, hazel nuts, cashews and sesame seeds by grinding said non-fat constituents to particle size of less than 140 mesh (U.S. Sieve Series),
    (b) admixing at least an equal amount by weight of water to said released fat and ground non-fat cotyledons constituents at a temperature sufficient to melt said fat and for a period of time sufficient to provide a stable emulsion; and, (c) providing a powdered nut product consisting essentially of edible fat globules encapsulated by a continuous phase of non-fat cotyledon nut constituents by drying said stable emulsion in a particulate form.

10. A method for making a powdered nut product consisting essentially of an edible fat and non-fat nut cotyledon constituents, said method consisting essentially of:
(a) releasing the encapsulated fat contained in a nut cotyledon selected from the group consisting of peanuts, almonds, pecans, walnuts, hazel nuts, cashews and sesame seeds by grinding the non-fat nut cotyledon constituents to a particle size of less than 140 mesh sieve (U.S. Sieve Series),
(b) mixing said ground non-fat constituents and released fat with water wherein the weight ratio of water to ground non-fat constituents and released fat ranges from at least 1:1 to 4:1 parts by weight at a temperature and period of time sufficient to provide a stable emulsion; and,
(c) providing a powdered nut product consisting essentially of a discontinuous phase of fat globules and non-fat nut cotyledon constituents encapsulating said fat globules by drying said stable emulsion in a particulate form.

11. The product of claim 6 wherein said continuous phase and said discontinuous phase consists essentially of the constituents of peanut cotyledons.

12. The method of claim 9 wherein said emulsion is spray dried.

13. The method of claim 9 wherein said nut cotyledons are peanuts.

14. The method of claim 10 wherein said nut cotyledons are peanuts.

15. The method of claim 10 wherein said emulsion is spray dried.

References Cited by the Examiner

UNITED STATES PATENTS

| | | | |
|---|---|---|---|
| 2,079,030 | 5/1937 | Northcutt | 99—125 |
| 2,511,119 | 6/1950 | Mitchell | 99—128 |
| 3,115,412 | 12/1963 | Schoppe et al. | 99—126 |

FOREIGN PATENTS 937,564   9/1963   Great Britain.

A. LOUIS MONACELL, *Primary Examiner.*

RAYMOND N. JONES, *Examiner.*

S. E. HEYMAN, *Assistant Examiner.*